United States Patent
Jia et al.

(10) Patent No.: US 8,830,394 B2
(45) Date of Patent: *Sep. 9, 2014

(54) SYSTEM, METHOD, AND APPARATUS FOR PROVIDING IMPROVED HIGH DEFINITION VIDEO FROM UPSAMPLED STANDARD DEFINITION VIDEO

(71) Applicant: Broadcom Corporation, Irvine, CA (US)

(72) Inventors: Yunwei Jia, Thornhill (CA); Samir Hulyalkar, Los Gatos, CA (US); Steven Hanna, Richmond Hill (CA); Lee Shu Key, Markham (CA)

(73) Assignee: Broadcom Corporation, Irvine, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/053,064

(22) Filed: Oct. 14, 2013

(65) Prior Publication Data

US 2014/0036147 A1    Feb. 6, 2014

Related U.S. Application Data

(63) Continuation of application No. 12/641,101, filed on Dec. 17, 2009, now Pat. No. 8,558,948.

(51) Int. Cl.
*H04N 7/01* (2006.01)
*H04N 7/015* (2006.01)
*G06T 1/00* (2006.01)

(52) U.S. Cl.
CPC ............ *H04N 7/0157* (2013.01); *H04N 7/012* (2013.01); *H04N 7/0117* (2013.01); *G06T 1/00* (2013.01); *H04N 7/01* (2013.01)
USPC ................ 348/441; 375/240.16; 375/E7.076; 348/552

(58) Field of Classification Search
CPC ................................. H04N 7/012; H04N 7/01
USPC ......................... 348/441, 452, 429.1, E7.003; 375/240.16, E7.076
See application file for complete search history.

(56) References Cited

U.S. PATENT DOCUMENTS

| | | | |
|---|---|---|---|
| 7,215,831 B2 | 5/2007 | Altunbasak et al. | |
| 8,339,512 B2 | 12/2012 | Ota | |
| 2009/0010568 A1 | 1/2009 | Nakagami et al. | |
| 2009/0232213 A1* | 9/2009 | Jia | 375/240.16 |
| 2011/0019082 A1* | 1/2011 | Su et al. | 348/441 |
| 2011/0141348 A1 | 6/2011 | Jia et al. | |
| 2011/0149150 A1 | 6/2011 | Jia et al. | |

* cited by examiner

*Primary Examiner* — Jefferey Harold
*Assistant Examiner* — Omer Khalid
(74) *Attorney, Agent, or Firm* — Foley & Lardner LLP; Christopher J. McKenna; Daniel Rose

(57) ABSTRACT

Presented herein are system(s), method(s), and apparatus for providing high resolution frames. In one embodiment, there is a method comprising receiving upscaled frames; motion estimating the upscaled frames; and motion compensating the upscaled frames.

16 Claims, 17 Drawing Sheets

SYSTEM, METHOD, AND APPARATUS FOR PROVIDING IMPROVED HIGH DEFINITION VIDEO FROM UPSAMPLED STANDARD DEFINITION VIDEO

CROSS-REFERENCE TO RELATED APPLICATIONS/INCORPORATION BY REFERENCE

This application is a continuation of, and claims priority to, co-pending U.S. patent application entitled "SYSTEM, METHOD, AND APPARATUS FOR PROVIDING IMPROVED HIGH DEFINITION VIDEO FROM UPSAMPLED STANDARD DEFINITION VIDEO" filed on Dec. 17, 2009 and assigned application Ser. No. 12/641,101, which is incorporated herein by reference in its entirety.

FEDERALLY SPONSORED RESEARCH OR DEVELOPMENT

[Not Applicable]

BACKGROUND OF THE INVENTION

High Definition (HD) displays are becoming increasingly popular. Many users are now accustomed to viewing high definition media. However, a lot of media, such as older movies, and shows were captured in Standard Definition (SD). Since the actual scene was captured by a video camera that only captured the scene in standard definition, even if the display is high definition, there are not enough pixels to take advantage of the display.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

The present invention is directed to system(s), method(s), and apparatus for providing improved high definition video from up-sampled standard definition video, substantially as shown in and/or described in connection with at least one of the figures, as set forth more completely in the claims.

These and other advantages and novel features of the present invention, as well as illustrated embodiments thereof will be more fully understood from the following description and drawings.

DETAILED DESCRIPTION OF PREFERRED EMBODIMENTS

Figure 1:
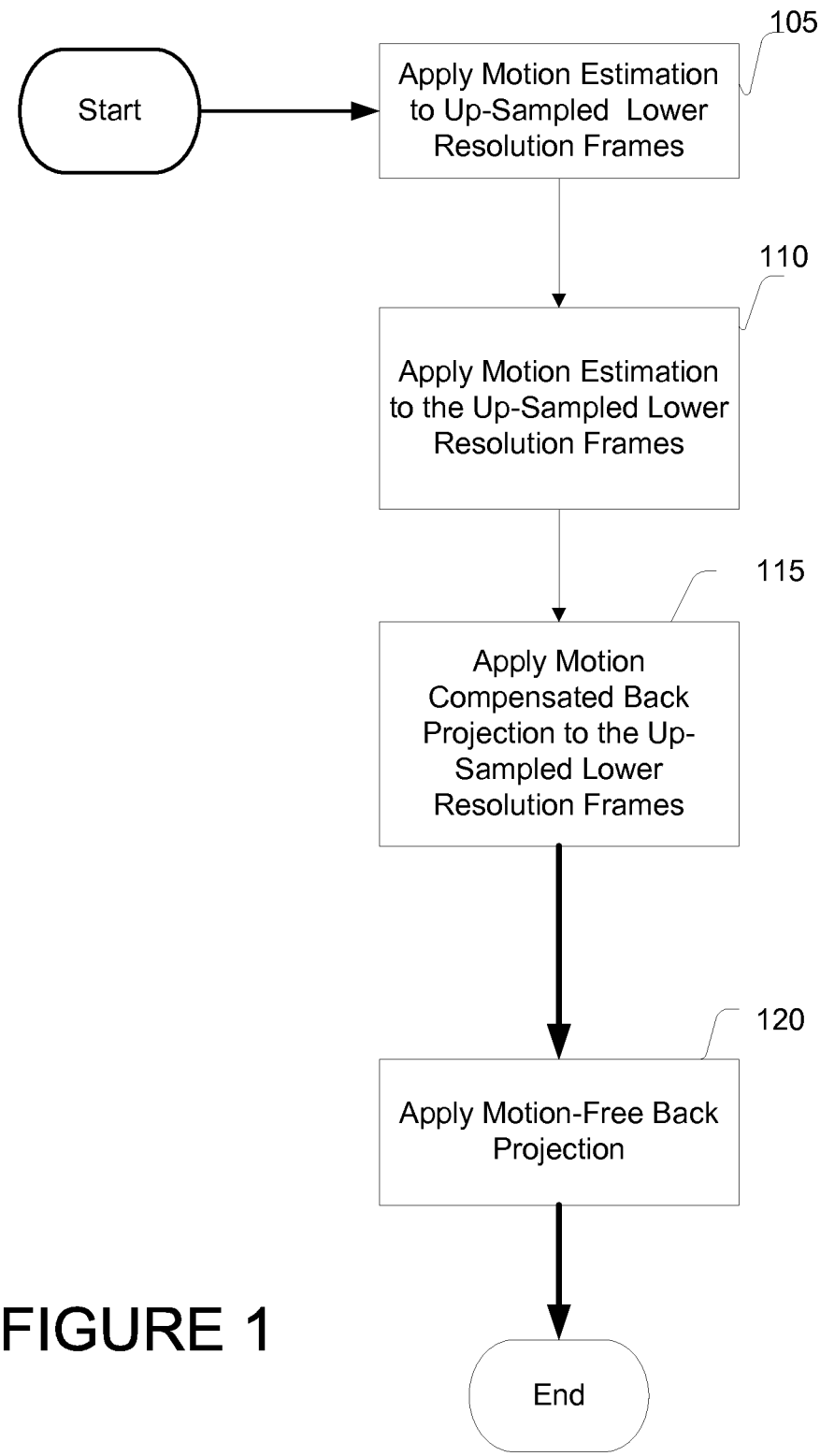
FIG. 1 is a flow diagram for providing high resolution frames in accordance with an embodiment of the present invention.

Referring now to FIG. 1, there is illustrated a flow diagram for providing high resolution frames in accordance with an embodiment of the present invention. At 105, up-sampled or spatially interpolated lower resolution frames, such as standard definition frames, with higher resolution, such as high definition, are received.

At 110, motion estimation is applied to the up-sampled or spatially interpolated lower resolution frames, such as standard definition frames, with higher resolution. At 115, motion compensated back projection is applied, followed by motion-free back projection at 120.

Figure 2:
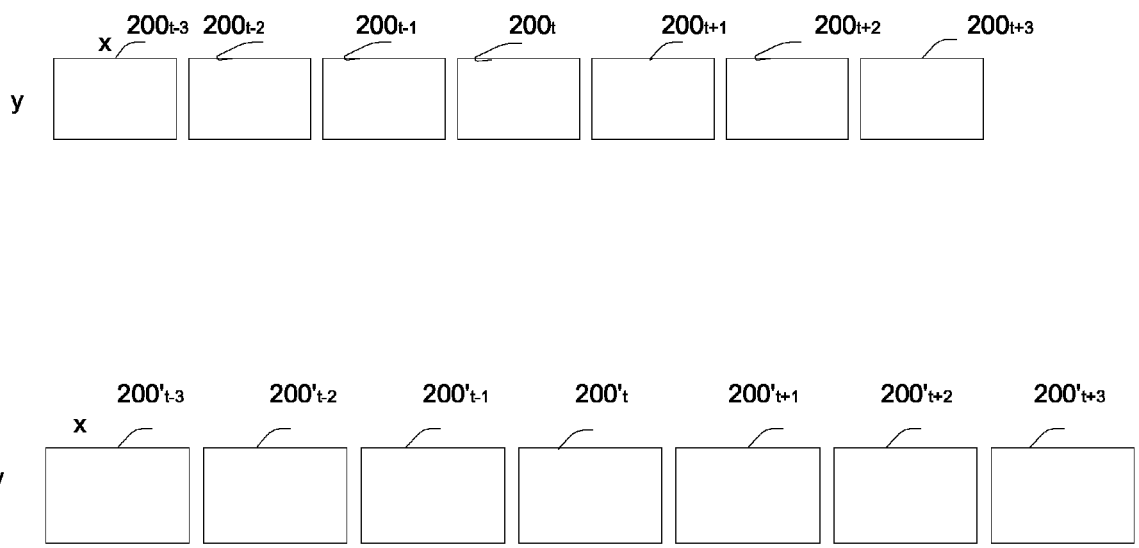
FIG. 2 is a block diagram describing an exemplary up-sampled lower resolution frame with higher resolution.

Referring now to FIG. 2, a block diagram is shown which describes exemplary up-sampled or spatially interpolated lower resolution frames with higher resolutions that may be received during 105. Video data comprises a plurality of frames 100 that are captured at time intervals t. Frames 200 comprise two dimensional grids of pixels that . . . , $200_{t-3}(x,y)$, $200_{t-2}(x,y)$, $200_{t-1}(x,y)$, $200_{t}(x,y)$, $200_{t+1}(x,y)$, $200_{t+2}(x,y)$, $200_{t+3}(x,y)$, . . . . The number of pixels in the frame 200 determines the level of detail in the video data.

Standard definition video uses frames sizes that are 480V× 720H pixel. High definition video uses frames with higher resolutions, such as 960V×1440H that can be scaled to 1080V×1920H. Up-sampling standard definition pictures by spatial interpolation can result in frames that have the same resolution as high definition frame $200'_{t-3}(x,y)$, $200'_{t-2}(x,y)$, $200'_{t-1}(x,y)$, $200'_{t}(x,y)$, $200'_{t+1}(x,y)$, $200'_{t+2}(x,y)$, $200'_{t+3}(x,y)$, . . . . However, the foregoing frames normally do not result in increased perceived resolution.

Figure 3:
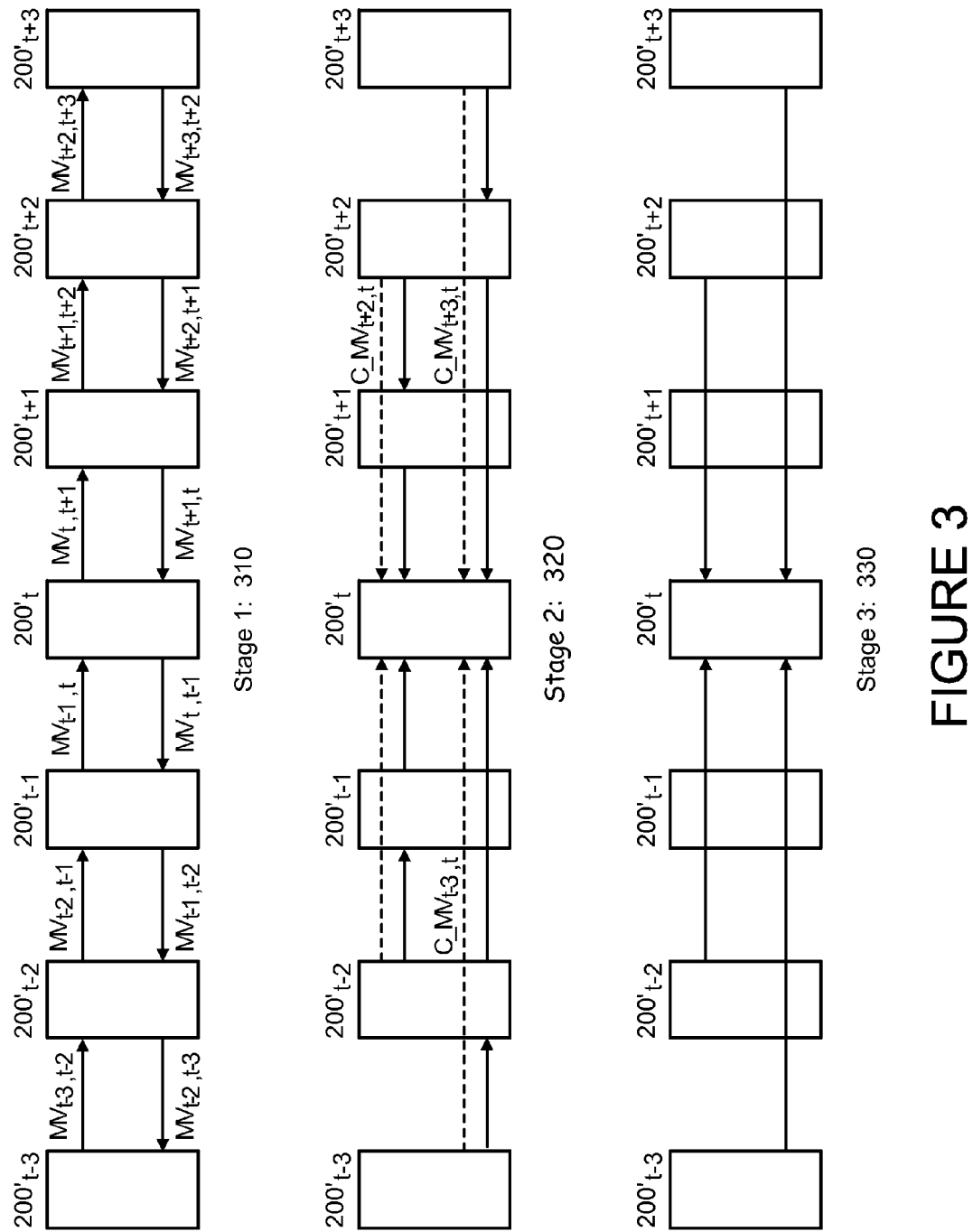
FIG. 3 is a block diagram describing motion estimation in accordance with an embodiment of the present invention.

FIG. 3 describes exemplary motion estimation that can be performed during 110 in accordance with an embodiment of the present invention. An exemplary purpose of the proposed method of motion estimation using staged procedures is to achieve a large effective search area by covering small actual search areas in each motion estimation stage. This is especially useful when a large number of low resolution frames are used to generate a high resolution frame, since in that case, the motion between two non-adjacent frames may be relatively substantial. For example, locating a best matching block in a frame that is substantially distant in time, may require the search of a large frame area.

ME stage 1: In the first stage, details of which are shown in 310, motion estimation is performed between pairs of neighboring upsampled frames $200'_{t-3}$ and $200'_{t-2}$, $200'_{t-2}$, and $200'_{t-1}$, $200'_{t-1}$ and $200'_{t}$, $200'_{t}$ and $200'_{t+1}$, $200'_{t+1}$, $200'_{t+2}$, $200'_{t+2}$ and $200'_{t+3}$. For each pair of neighboring frames, two motion estimations are performed.

In the first motion estimation, the earlier frame is the reference frame and divided into predetermined sized blocks. The later frame $200'_t$ is the target frames and is searched for a block that best matches the block in the reference frame. In the second motion estimation, the later frame is the reference frame and is divided into predetermined sized blocks. The earlier frame is the target frame and is searched for a block that best matches.

Figure 4:
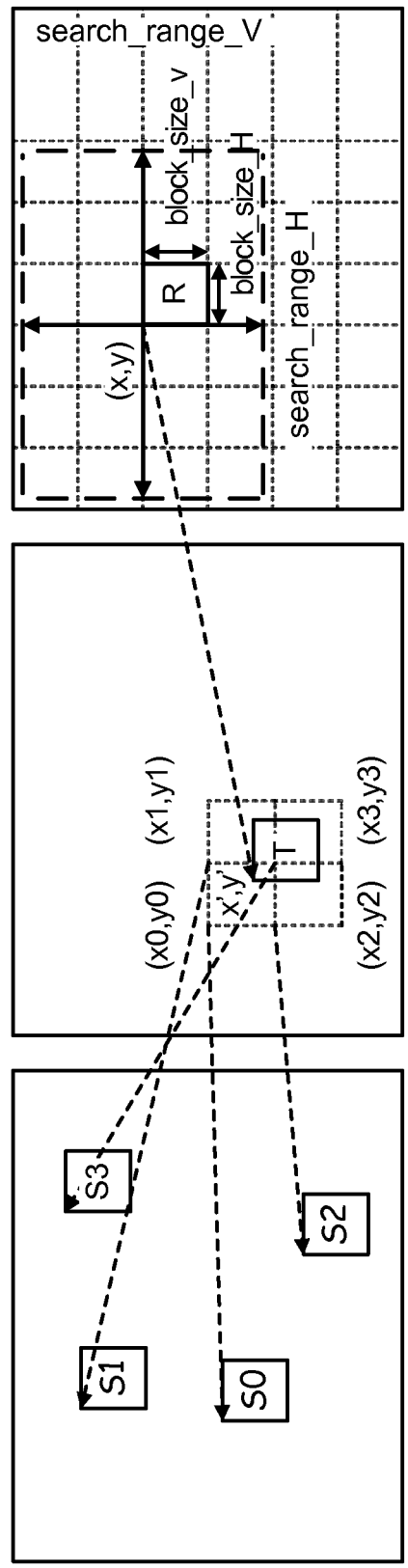
FIG. 4 is a block diagram describing motion estimation for non-adjacent frames in accordance with an embodiment of the present invention.

Referring now to FIG. 4, motion estimation in this stage is based on full-search block matching, with (0, 0) as search center and a rectangular search area with horizontal dimension search_range_H and vertical dimension search_range_V. The reference frame is partitioned into non-overlapping blocks of size block_size_H×block_size_V. Next, for a block R in a reference frame with top-left pixel at (x, y), the corresponding search area is defined as the rectangular area in the target frame delimited by the top-left position (x−0.5*search_range_H, y−0.5*search_range_V) and its bottom-right position (x+0.5*search_range_H/2, y+0.5*search_range_V), where search_range_H and search_range_V are programmable integers. Thereafter, in searching for the best-matching block in the target frame for the block R in the reference frame, R is compared with each of the blocks in the target frame whose top-left pixel is included in the search area. The matching metric used in the comparison is the sum of absolute differences (SAD) between the pixels of block R and the pixels of each candidate block in the target frame. If, among all the candidate blocks in the search area, the block at the position (x', y') has the minimal SAD, then the motion vector (MV) for the block R is given by (MVx, MVy) where MVx=x−x', and MVy=y−y'.

As can be seen from the foregoing, processing frame $200'_t$ uses motion estimation from the three frames that follow $200'_t$, e.g., $200_{t+1}$, $200_{t+2}'$, $200_{t+3}'$, and the three that precede, e.g., $200_{t-1}'$, $200_{t-2}'$, $200_{t-3}'$. Similarly, processing frame $200'_{t-1}$, would use motion estimation from frames $200'_t$, $200_{t-1}'$, $200_{t+2}'$. Thus, processing frame $200_t'$ after frame $200_{t-1}'$ only requires motion estimation between frames $200_{t+2}'$ and $200_{t+3}'$, if the motion estimation results are buffered.

After the first stage of motion estimation, the next two stages may be performed in the following order at frame level: first, stages 2 and 3 for $200'_{t-2}$ and $200'_{t+2}$, then stage 2 and 3 for $200'_{t-3}$ and $200'_{t+3}$.

ME stage 2: Referring again to FIG. 3, in this stage, details of which are shown in 320, the motion vectors between non-adjacent frames are predicted based on the available motion estimation results, thereby resulting in predicted motion vectors. The predicted motion vectors will be used as search centers in stage 3. For example, the predicted motion vectors between $200'_{t+2}$ as the reference frame and $200_t'$ as the target frame, can be represented as C_MV(t+2, t). To determine C_MV(t+2, t), motion vectors between $200'_{t+1}$ and $200'_{t+2}$ and $200'_t$ and $200_{t+1}'$, both being available from the previous stage of motion estimation processing, can be combined.

For example, as shown in FIG. 4, a block R at location (x, y) in $200'_{t+2}$ may have its best-matching block in $200'_{t+1}$ as block T, which is determined in the motion estimation between $200'_{t+2}$ as the reference frame and $200'_{t+1}$ as the target frame. Note that although R is aligned with the block grids, for example, x % block_size_H1=0 and y % block_size_V1=0, T may not be aligned with the block grid of its frame, and may be located anywhere in the search area. Block T may contain pixels from up to four grid-aligned blocks whose top-left pixels are at (x0, y0), (x1, y1), (x2, y2), and (x3, y3), respectively. In case of less than four grid-aligned blocks covered by T, some of the four top-left pixels overlap. The predicted motion vector for R from $200'_{t+2}$ to $200'_t$ may be set as the summation of the motion vectors for the block R from $200'_{t+2}$ to $200'_{t+1}$ and the median of the motion vectors for the block T from $200'_{t+1}$ to $200'_t$, as shown in Equation 1:

$$C\_MV(t+2,t,x,y)=MV(t+2,t+1,x,y)+\text{median}(MV(t+1,t,xi,yi),i=0,1,2,3) \quad (1)$$

where the median of a set of motion vectors may be the motion vector with the lowest sum of distances to the other motion vectors in the set. For example, consider each motion vector in the set as a point in the two dimensional space, and calculate the distance between each pair of motion vectors in the set. The median of the set may then be the motion vector whose summation of the distances to other motion vectors is minimal among the motion vectors in the set. Note that in other embodiments, the distance between two motion vectors may be calculated as the Cartesian distance between the two points corresponding to the two motion vectors, or it may be approximated as the sum of the horizontal distance and the vertical distance between the two motion vectors to reduce computing complexity.

Similarly, the predicted motion vectors from $200'_{t+3}$ as the reference frame to $200'_t$ as the target frame is obtained by cascading the motion vectors from $200'_{t+3}$ to $200'_{t+2}$ with the motion vectors from $200'_{t+2}$ and $200'_t$. The predicted motion vectors from $200'_{t-3}$ and $200'_t$ can be obtained in a similar manner.

In another embodiment of this invention, in predicting the motion vector for R from non-adjacent frames, the median operator in Equation 1 may be replaced with the arithmetic average of the four motion vectors. In another embodiment, in predicting the motion vector for R, the minimal SAD between the block T and each of the four blocks may be used in Equation 1 to replace the median of the four motion vectors. In yet another embodiment of this invention, in predicting the motion vector, one may calculate the SAD corresponding to each of the following four motion vectors and choose the one with the minimal SAD.

ME stage 3: Referring again to FIG. 3, in the last stage 330 of processing in the motion estimation block, the predicted motion vectors are refined to determine to determine actual motion vectors between $200'_{t+k}$, $200'_t$ for (k=−3, −2, 2, 3), by searching around the corresponding predicted motion vectors. For example, to determine the motion vectors, a block-based motion estimation is performed with a search center at (x+C_MVx(t+k, t), y+C_MVy(t+k, t)) and a search areas (search_range_H2, search_range_V2) and (search_range_H3, search_range_V3), where the foregoing are programmable integers representing respectively the horizontal search range and vertical search range. The search range at this stage may be set to be smaller than that in the stage 1 of motion estimation to reduce the computational complexity of motion estimation.

Motion-Compensated Back Projection

Subsequent to motion estimation processing, the image $200'_t$ is subjected to processing for motion-compensated back projection (MCBP) in 115. The inputs to this block are the frames and motion estimation results from $200'_{t+k}$, (k=−3, −2, −1, 1, 2, 3), and frame $200'_t$. The output from the MCBP processing block is the updated high resolution frame, denoted as $200''_t$.

At frame level, the procedures in this block 110 are performed in the cascaded order, t+3, t−3, t+2, t−2, t+1, t−1, that favors frames that are temporally close to $200'_t$ over frames further away. Temporally close frames are favored because motion estimation is generally more reliable for a pair of frames with a smaller temporal distance than that with a larger temporal distance.

Figure 5A:
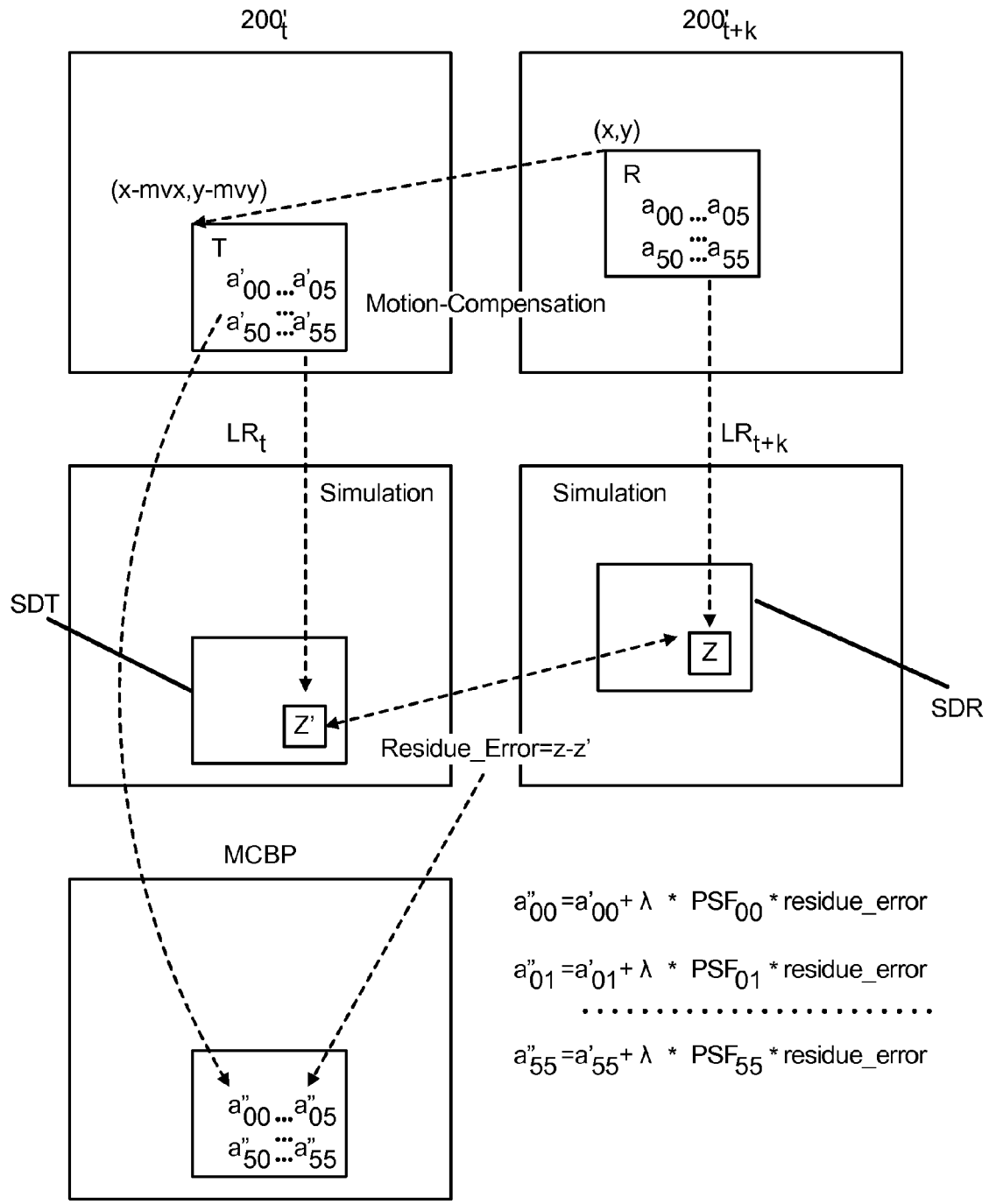
FIG. 5A is a block diagram describing motion compensated back projection in accordance with an embodiment of the present invention.

Referring now to FIG. 5A, there is illustrated a block diagram describing motion compensation back projection between two exemplary frames during 115.

For each block-grid-aligned block R in $200'_{t+3}$ the corresponding motion-compensated block T in $200'_t$ is found using the motion estimation results. For example, if block R is at the position (x, y) in $200'_{t+3}$ and its motion vector is (mvx, mvy), the corresponding motion compensated block T is the block at the position (x-mvx, y-mvy) in $200'_t$. Next, blocks in lower resolution frames that are co-located with block R and T are found.

It is noted that in certain embodiments of the present invention, the lower resolution frames 200 will not be available. Accordingly, simulated lower resolution frames LR are generated by downsampling frames $200'$. In the foregoing case, the lower resolution frames 200 will be different from the simulated lower resolution frames LR. Simulated blocks SDR, SDT in simulated lower resolution frames LR, $LR_{t+k}$ would be co-located with block R in frame $200'_{t+3}$ and block T in $200'_t$.

To simulate each pixel z and z' of the blocks SDR and SDT z', the point spread function (PSF) in the image acquisition process is used. Since PSF is generally not available to high-resolution processing and it often varies among video sources, an assumption may be made with regard to the PSF, considering both the desired robustness and computational complexity.

For example, a poly-phase down-sampling filter may be used as PSF. The filter may comprise, for example, a 6-tap vertical poly-phase filter and a consequent 6-tap horizontal poly-phase filter. As shown, the pixel z in SDR is either co-located or in the vicinity of $a_{00}$ to $a_{55}$ in $200'_{t+3}$, while pixel z' in SDT is either co-located or in the vicinity of $a'_{00} \ldots a'_{55}$. Pixel z' can be calculated as follows:

$$z' = \sum_{i=0}^{5}\sum_{j=0}^{5} PSF_{ij} * a'_{ij} \tag{2}$$

where $PSF_{ij}$ is the coefficient in the PSF corresponding to $a'_{ij}$. Pixel z can be calculated using $a_{ij}$ instead of $a'_{ij}$. In another embodiment of this invention, a bi-cubic filter may be used as the PSF.

The residue error between the simulated pixel z' and the observed pixel z is computed, as residue_error=z−z'. The pixels in $200'_t$ can be updated for example, from pixels $a'_{00} \ldots a'_{55}$ in $200'_t$ to pixels $a''_{00} \ldots a''_{55}$, according to the calculated residue error and scaling factor as shown below.

$$a_{ij}'' = a'_{ij} + \lambda * PSF_{ij} * \text{residue (for } i=0 \ldots 5, j=0 \ldots 5) \tag{3}$$

The residue error is scaled by $\lambda * PSF_{ij}$ and added back to the pixel $a'_{ij}$ in $200'_t$ to generate the pixel $a''_{ij}$. A purpose of $PSF_{ij}$ is to distribute the residue error to the pixels $a'_{ij}$ in $200'_t$ according to their respective contributions to the pixel z'. As proposed herein, a purpose of the scaling factor $\lambda$ is to increase the robustness of the algorithm to motion estimation inaccuracy and noise. $\lambda$ may be determined according to the reliability of the motion estimation results for the block R. The motion estimation results can include (mvx, mvy, sad, nact). Among the eight immediate neighboring blocks of R in $200'_{t+3}$, sp may be the number of blocks whose motion vectors are not different from (mvx, mvy) by 1 pixel (in terms of the high-resolution), both horizontally and vertically. In an embodiment of this invention, $\lambda$ may be determined below:

| if sp ≥ 1 && sad<nact*4/4 | $\lambda = 1$; |
| else if sp ≥ 2 && sad<nact*6/4 | $\lambda = 1/2$; |
| else if sp ≥ 3 && sad<nact*8/4 | $\lambda = 1/4$; |
| else if sp ≥ 4 && sad<nact*10/4 | $\lambda = 1/8$; |
| else if sp ≥ 5 && sad<nact*12/4 | $\lambda = 1/16$; |
| else | $\lambda = 0$; |

The contribution from the residue error to updating the pixels in $200'_t$ can be proportional to the reliability of the motion estimation results. This proportionality is measured in terms of motion field smoothness, represented by the variable sp in the neighborhood of R and how good the match is between R and T, for example, as represented by comparison of sad and nact.

In another embodiment of the invention, in calculating the scaling factor $\lambda$, the reliability of the motion estimation results may be measured using the pixels in $200'_t$ and $200'_{t+3}$ corresponding to the pixel z, i.e., $a_{00} \ldots a_{55}$ in $200'_{t+3}$ and $a'_{00} \ldots a'_{55}$ in $200'_t$. For example, sad and nact be computed from these pixels only instead from all the pixels in R and T.

For example, if the block size is 4×4 pixels, the sad between R and T may be defined as in Equation 3:

$$\text{sad} = \sum_{i=-1}^{4}\sum_{j=-1}^{4} |R_{i,j} - T_{i,j}| \tag{3}$$

and act of R may be defined as in Equation 4:

$$\text{act} = \sum_{i=-1}^{3}\sum_{j=-1}^{4} |R_{i,j} - R_{i+1,j}| + \sum_{i=-1}^{4}\sum_{j=-1}^{3} |R_{i,j} - R_{i,j+1}| \tag{4}$$

$R_{i,j}$ refers to the i,j pixel of R, and likewise $T_{i,j}$ refers to the i,j pixel of T. Block R is a rectangular area with a top-left pixel of $R_{0,0}$ and a bottom right pixel of $R_{3,3}$. Likewise block T is a rectangular area with a top-left pixel of $T_{0,0}$ and a bottom right pixel of $T_{3,3}$. Equations (3) and (4) are indicative of the fact that the pixels surrounding R and T may also be used in the computation of sad and act. The activity of a block may be used to evaluate the reliability of corresponding motion estimation results. To accurately reflect reliability, act may have to be normalized against the corresponding SAD in terms of the number of absolute pixel differences, as shown below in Equation 5:

$$nact = \frac{act * num\_pixels\_in\_sad}{num\_pixels\_in\_act} \quad (5)$$

where num_pixels_in_sad is the number of absolute pixel differences in the calculation of sad, and num_pixels_in_act is that of act, respectively. The term nact is the normalized activity of the block. Note that the surrounding pixels of R and T may be used in calculating sad and act as well.

The foregoing can be repeated for the frames for each time period t–3, t–2, t–1, t+1, t+2, and t+3, resulting in a motion compensated back predicted higher resolution frame $200''_t$.

Motion Free Back Projection

Subsequent to motion compensated back projection at 115, the image $200'_t$ is subjected to processing for motion-free back projection (MCBP) at 120. The inputs to this block are the frame $200'_t$, and motion compensated back predicted higher resolution frame $200''_t$. The output from the MCBP processing block is the high resolution frame.

Motion-free back projection between frame $200'_t$ and frame $200''_t$ are performed similar to motion-compensated back projection, except that all motion vectors are set to zero and the weighting factor $\lambda$ is a constant.

Figure 5B:
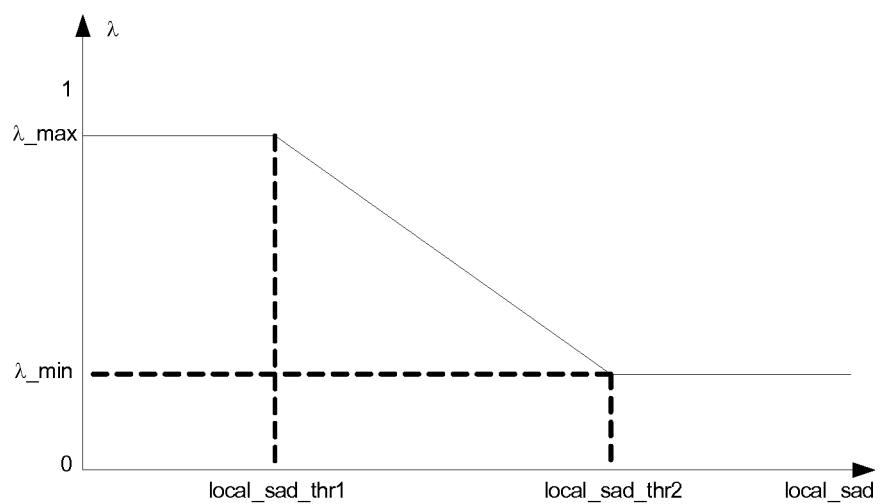
FIG. 5B is a block diagram describing the relationship between a scaling factor and the local sum of absolute differences (SAD)

Referring now to FIG. 5B, there is illustrated a graph describing the relationship between the scaling factor $\lambda$ as a function of the SAD. The scaling factors $\lambda$ can be in a range between a maximum value $\lambda\_max$ that is less than 1, and a minimum value $\lambda\_min$ that is greater than zero. For all SAD that is less than a first threshold local_sad_thr1, $\lambda=\lambda\_max$. For all SAD that is more than a second threshold, local_sad_thr2, $\lambda=\lambda$ min. The $\lambda$ varies linearly between $\lambda$ max and $\lambda$ min for all SAD between local_sad_thr1 and local_sad_thr2.

Figure 5C:
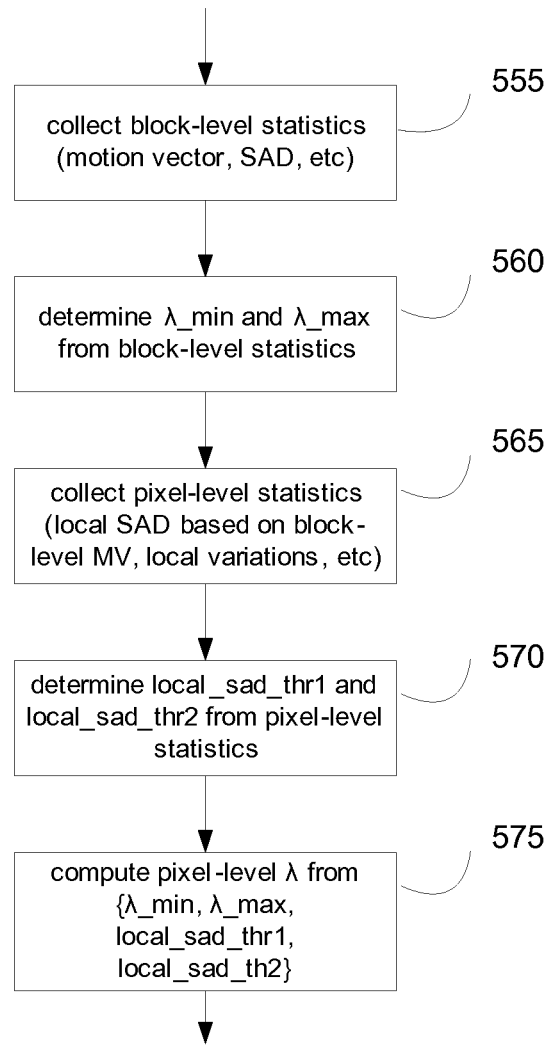
FIG. 5C is a flow diagram describing the selection of the scaling factor in accordance with an embodiment of the present invention.

Referring now to FIG. 5C, there is illustrated a flow diagram describing calculation of the pixel-level adaptive scaling factor $\lambda$. At 555, block-level statistics (motion vector, SAD, for example) are collected. At 560, $\lambda$ max and $\lambda$ min are determine from block-level statistics. At 565, pixel level statistics, such as local SAD, based on block-level motion vectors, local variations are collected. At 570, the local_sad_thr1 and local_sad_thr2 are determined from pixel-level statistics. At 575, pixel-level $\lambda$ from $\lambda\_min$, $\lambda\_max$, local_sad_thr1, and local_sad_thr2.

Figure 6:
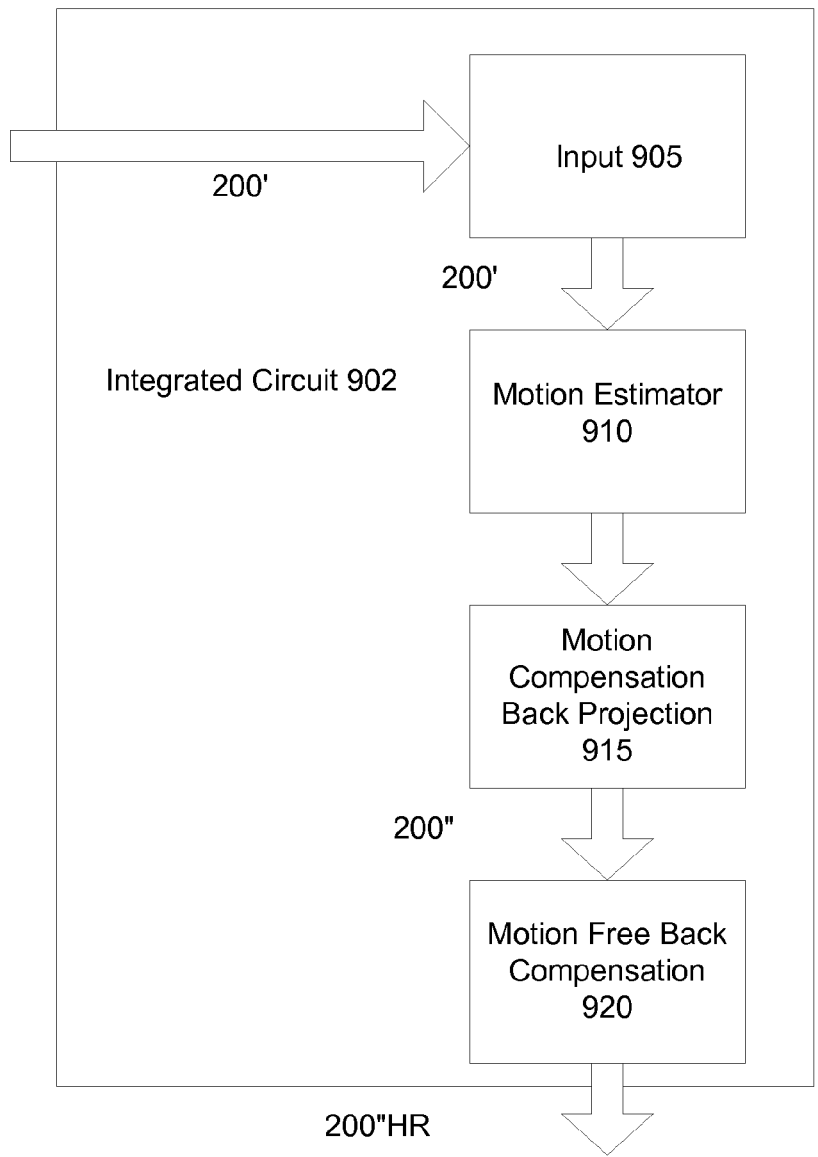
FIG. 6 is an exemplary integrated circuit for providing high resolution frames in accordance with an embodiment of the present invention.

Referring now to FIG. 6, there is illustrated a block diagram describing a system for generating high-resolution frames. The system comprises an integrated circuit 902. The integrated circuit 902 comprises an input 905 that receives the lower resolution frames 200' that are upsampled to higher resolution during 105.

The integrated circuit 902 also includes a motion estimator 910 for performing the motion estimation described in 110, a motion compensation back projection circuit 915 for performing motion compensated back projection as described in 115, and a motion free back projection circuit 920 for performing motion-free back projection as described in 120. The motion compensation back projection circuit 915 receives the frames 200' and generates updated frames 200''. A motion-free back projection circuit 920 performs the motion-free back projection as described in 120 on the updated frames 200'' resulting in high resolution frames 200''HR for output.

It is noted that the motion estimator 910, the motion compensation back projection circuit 915, can be appropriately equipped with buffers to permit pipelining and recursion. For example, where three earlier frames and three later frames are used for a frame, the motion estimation results of the two earlier frames and all three later frames are also used for the next frame. Accordingly, the motion estimator 910 buffers the results of the motion estimation results of the two earlier frame and all three later frames. Additionally, motion estimator 910, motion compensation back projection circuit 915, and motion-free back projection circuit 920 can operate on three consecutive frames simultaneously.

Figure 7:
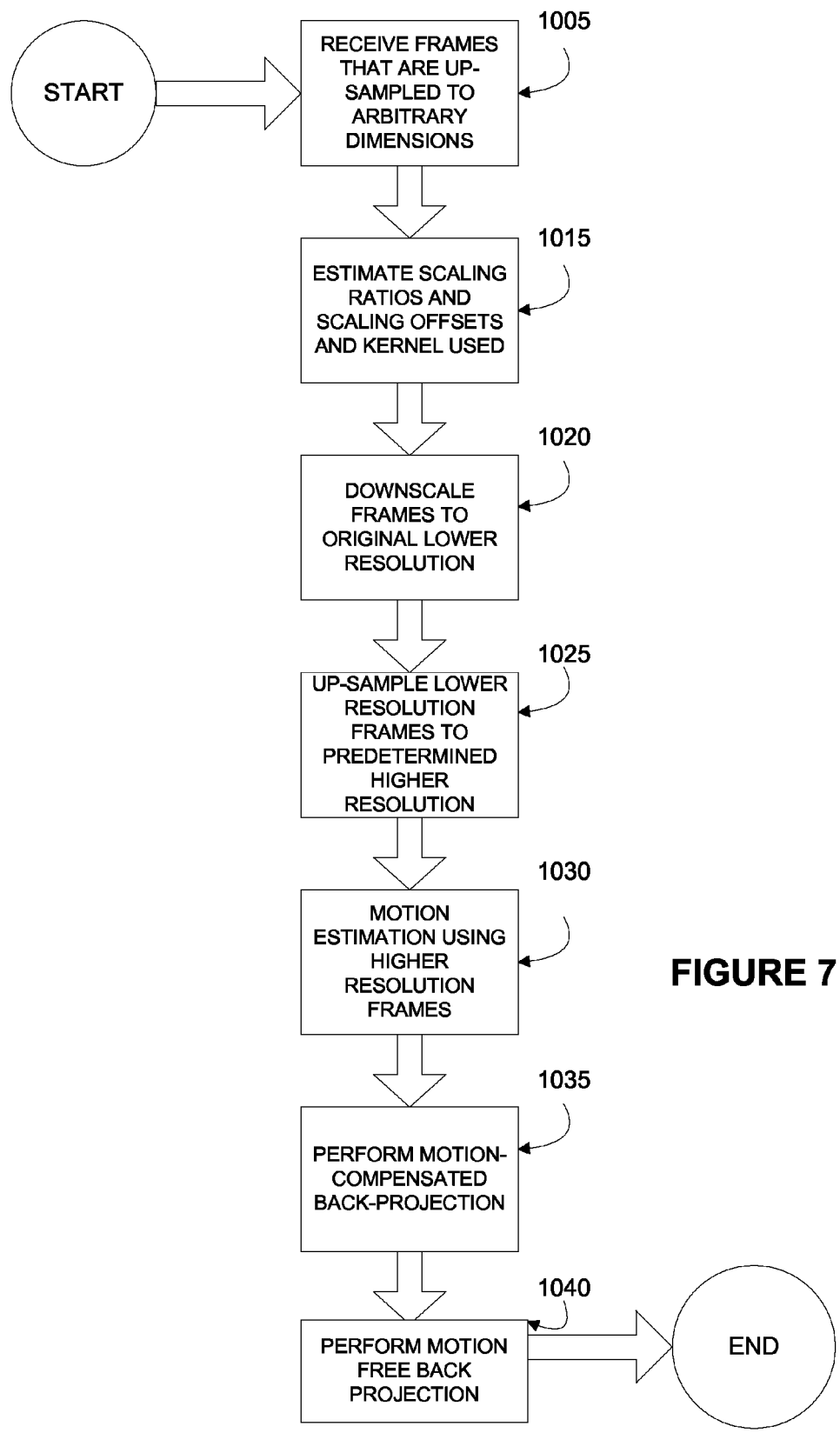
FIG. 7 is a flow diagram for providing high resolution frames in accordance with another embodiment of the present invention.

Referring now to FIG. 7, there is illustrated flow diagram describing an alternative method for generating high resolution frames. At 1005, frames are received that are up-sampled to arbitrary sizes. At 1015 the scaling ratios and scaling offsets between the original lower resolution pixels as well as the kernel (size and coefficients) used in the spatial interpolation are estimated. At 1020, the frames are downscaled resulting in the original lower resolution. At 1025, the lower resolution frames are up-sampled to the desired higher resolution, using spatial interpolation. At 1030, motion estimation is performed using the up-sampled high resolution frames. At 1035, the motion-compensated back-projection is performed on the up-sampled high resolution frames, resulting in updated frames. At 1040, motion-free back projection is performed on the updated high resolution frames, thereby resulting higher resolution frames.

Figure 8:
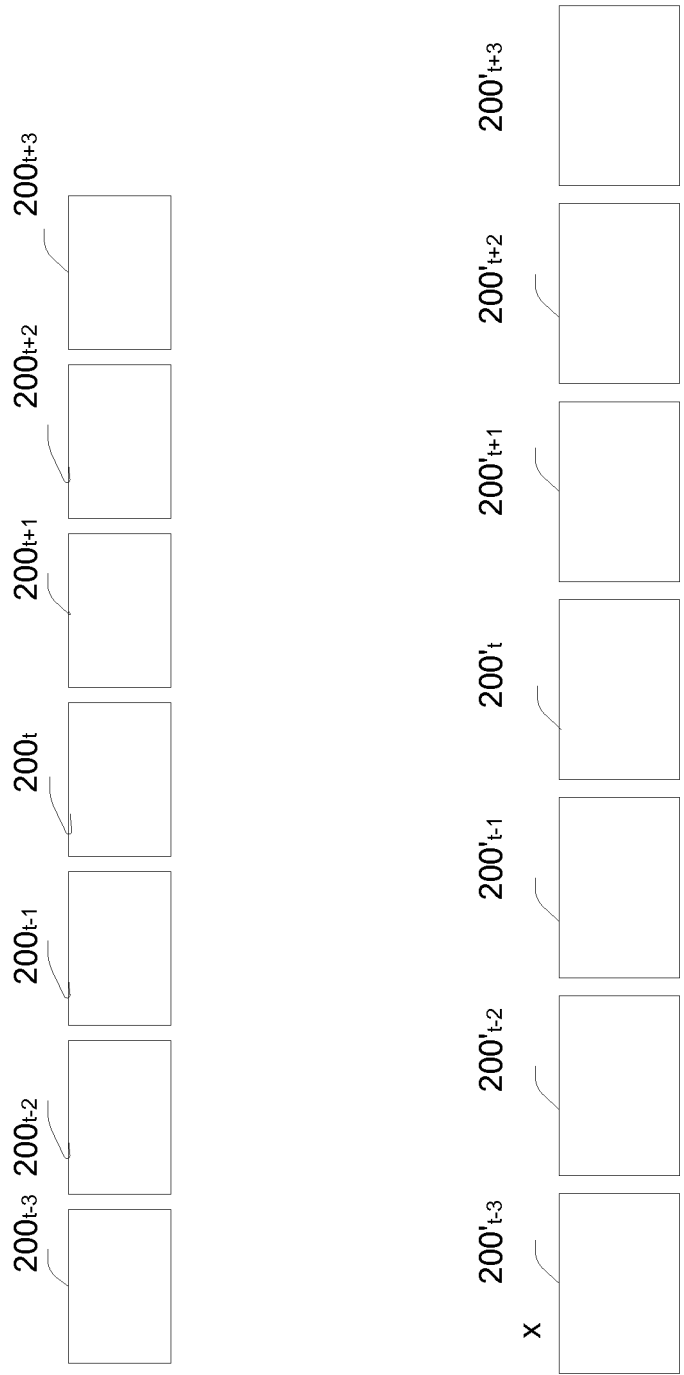
FIG. 8 is a block diagram describing an exemplary up-sampling a lower resolution.

Referring now to FIG. 8, describing exemplary up-sampling or spatially interpolating lower resolution frames to higher resolutions that may be received during 1025. Video data comprises a plurality of frames 100 that are captured at time intervals t. Frames 200 comprise two dimensional grids of pixels that . . . , $200_{t-3}(x,y)$, $200_{t-2}(x,y)$, $200_{t-1}(x,y)$, $200_t(x,y)$, $200_{t+1}(x,y)$, $200_{t+2}(x,y)$, $200_{t+3}(x,y)$, . . . . The number of pixels in the frame 200 determines the level of detail in the video data.

Standard definition video uses frame sizes that are 480× 720 pixels. The frames are up-sampled using, for example, spatial interpolation, to higher resolutions $200_{t-3}(x,y)'$, $200_{t-2}(x,y)'$, $200_{t-1}(x,y)'$, $200_t(x,y)'$, $200_{t+1}(x,y)'$, $200_{t+2}(x,y)'$, $200_{t+3}(x,y)'$, . . . .

Figure 9:
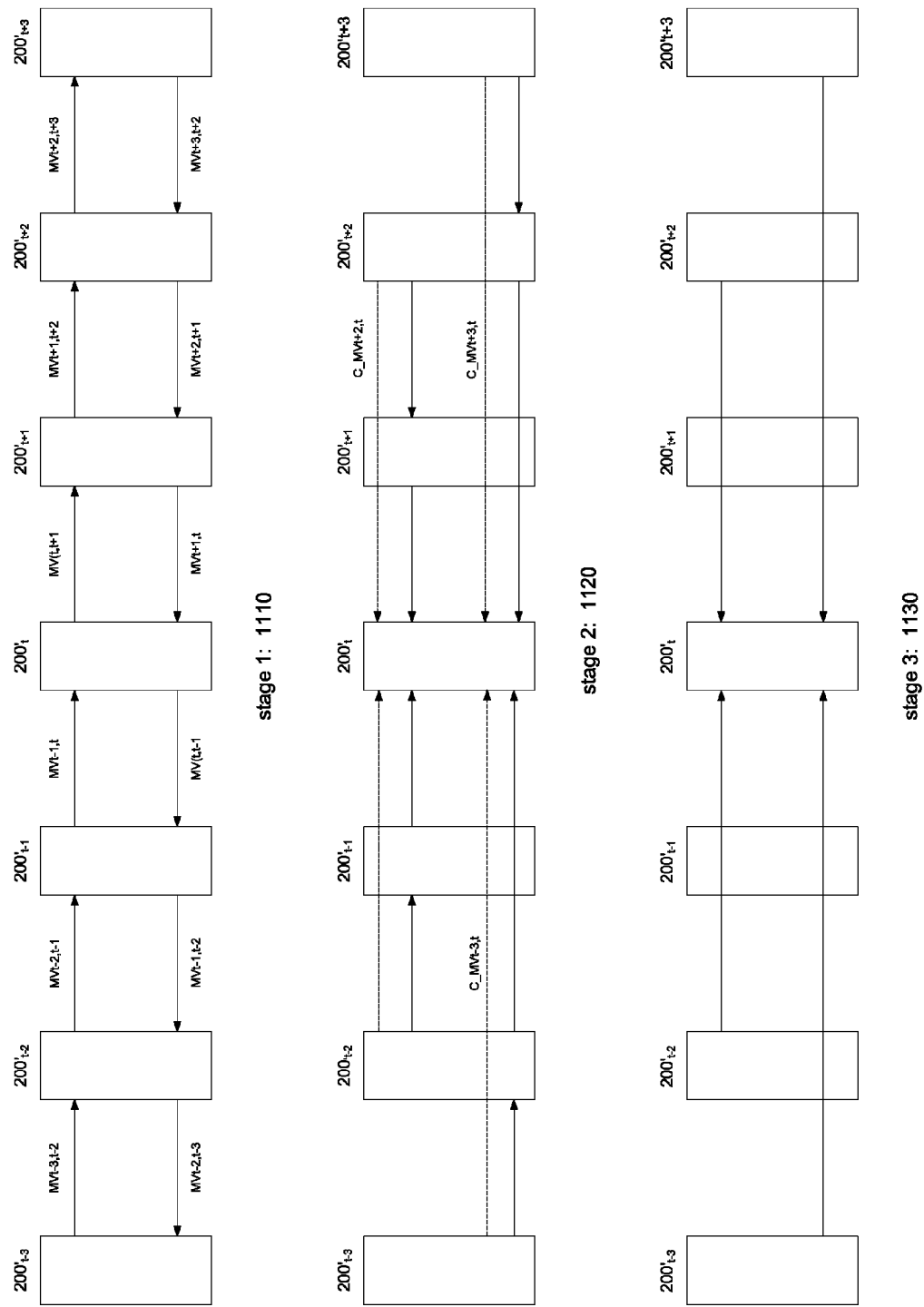
FIG. 9 is a block diagram describing motion estimation in accordance with an embodiment of the present invention.

FIG. 9 describes exemplary motion estimation that can be performed during 1030 in accordance with an embodiment of the present invention. An exemplary purpose of the proposed method of motion estimation using staged procedures is to achieve a large effective search area by covering small actual search areas in each motion estimation stage. This is especially useful when a large number of low resolution frames are used to generate a high resolution frame, since in that case, the motion between two non-adjacent frames may be relatively substantial. For example, locating a best matching block in a frame that is substantially distant in time, may require the search of a large frame area.

ME stage 1: In the first stage, details of which are shown in 1110, motion estimation is performed between pairs of neighboring upsampled frames $200'_{t-3}$ and $200'_{t-2}$, $200'_{t-2}$, and $200'_{t-1}$, $200'_{t-1}$ and $200'_t$, $200'_t$ and $200'_{t+1}$, $200'_{t+1}$, $200'_{t+2}$, $200'_{t+2}$ and $200'_{t+3}$. For each pair of neighboring frames, two motion estimations are performed.

In the first motion estimation, the earlier frame is the reference frame and divided into predetermined sized blocks. The later frame is the target frames and is searched for a block that matches. In the second motion estimation, the later frame is the reference frame and divided into predetermined sized blocks. The earlier frame is the target frame and is searched for a block that matches.

Figure 10:
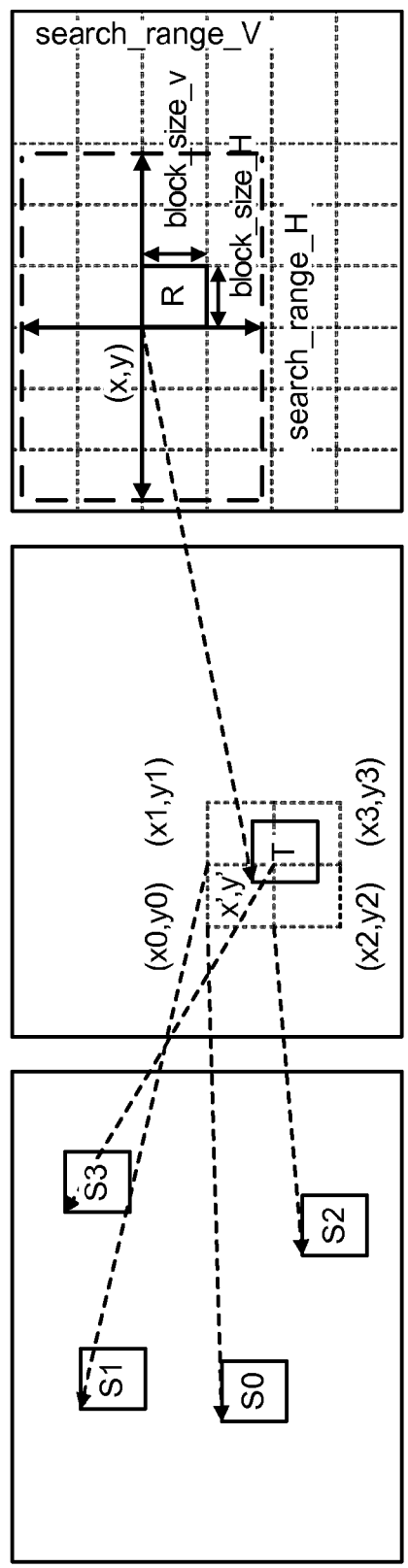
FIG. 10 is a block diagram describing motion estimation for non-adjacent frames in accordance with an embodiment of the present invention.

Referring now to FIG. 10, motion estimation in this stage is based on full-search block matching, with (0, 0) as search center and a rectangular search area with horizontal dimension search_range_H and vertical dimension search_range_V. The reference frame is partitioned into non-overlapping blocks of size block_size_H×block_size_V. Next, for a block R in a reference frame with top-left pixel at (x, y), the corresponding search area is defined as the rectangular area in the target frame delimited by the top-left position (x−0.5*search_range_H, y−0.5*search_range_V) and its bottom-right position (x+0.5*search_range_H/2, y+0.5*search_range_V), where search_range_H and search_range_V are programmable integers. Thereafter, in searching for the best-matching block in the target frame for the block R in the reference frame, R is compared with each of the blocks in the target frame whose top-left pixel is included in the search area. The matching metric used in the comparison is the SAD between the pixels of block R and the pixels of each candidate block in the target frame. If, among all the candidate blocks in the search area, the block at the position (x', y') has the minimal SAD, then the motion vector (MV) for the block R is given by (MVx, MVy) where MVx=x−x', and MVy=y−y'.

As can be seen from the foregoing, processing frame $200'_t$ uses motion estimation from the three frames that follow $200'_t$, e.g., $200'_{t+1}$, $200'_{t+2}$, $200'_{t+3}$. Similarly, processing frame $200'_{t-1}$, would use motion estimation from frames $200'_t$, $200'_{t+1}$, $200'_{t+2}$. Thus, processing frame $200'_t$ after frame $200'_{t-1}$ only requires motion estimation between frames $200'_{t+2}$ and $200'_{t+3}$, if the motion estimation results are buffered.

After the first stage of motion estimation, the next two stages are may be performed in the following order at frame level: first, stages 2 and 3 for $200'_{t-2}$ and $1200'_{t+2}$, then stage 2 and 3 for $200'_{t-3}$ and $200'_{t+3}$.

ME stage 2: In this stage, details of which are shown in 1120 in FIG. 9, the motion vectors between non-adjacent frames are predicted based on the available motion estimation results, thereby resulting in predicted motion vectors. The predicted motion vectors are used as search centers in stage 3. For example, the predicted motion vectors between $200_{t+2}'$ as the reference frame and $200_t'$ as the target frame, can be represented as C_MV(t+2, n). To determine C_MV(t+2, n), motion vectors between $200_{t+1}'$ and $200_{t+2}'$ and $200_t'$ and $200_{t+1}'$, both being available from the previous stage of motion estimation processing, can be combined.

A block R in $200_{t+2}'$ may have its best-matching block T in $200_{t+1}'$, which is determined in the motion estimation between $200_{t+2}'$ as the reference frame and $200_{t+1}'$ as the target frame. The block T in $200_{t+2}'$ may not be aligned with the block grid of its frame, and may be located anywhere in the search area. The block in $200_{t+2}'$ may contain pixels from up to four grid-aligned blocks. The predicted motion vector from $200_{t+2}'$ to $200_t'$ may be set as the summation of the motion vectors for the block from $200_{t+2}'$ to $200_{t+1}'$ and the median of the motion vectors for the block T from $200_{t+1}'$ to $200_t'$, as shown in Equation 6:

$$C\_MV(t+2,t,x,y) = MV(t+2,t+1,x,y) + \text{median}(MV(t+1,t,xi,yi), i=0,1,2,3) \quad (6)$$

where the median of a set of motion vectors may be the motion vector with the lowest sum of distances to the other motion vectors in the set.

For example, consider each motion vector in the set as a point in the two dimensional space, and calculate the distance between each pair of motion vectors in the set. The median of the set may then be the motion vector whose summation of the distances to other motion vectors is minimal among the motion vectors in the set. Note that in other embodiments, the distance between two motion vectors may be calculated as the Cartesian distance between the two points corresponding to the two motion vectors, or it may be approximated as the sum of the horizontal distance and the vertical distance between the two motion vectors to reduce computing complexity.

Similarly, the predicted motion vectors from $200_{t+3}'$ as the reference frame to $200_t'$ as the target frame is obtained by cascading the motion vectors from $200_{t+3}'$ to $200_{t+2}'$ with the motion vectors from $200_{t+2}'$ and $200_t'$. The predicted motion vectors from $200_{t-3}'$ and $200_t'$ can be obtained in a similar manner.

In another embodiment of the invention, in predicting the motion vector from non-adjacent frames, the median operator in Equation 6 may be replaced with the arithmetic average of the four motion vectors. In another embodiment, in predicting the motion vector, the minimal SAD between the block and each of the four blocks may be used in Equation 6 to replace the median of the four motion vectors. In yet another embodiment of this invention, in predicting the motion vector, one may calculate the SAD corresponding to each of the following four motion vectors and choose the one with the minimal SAD.

ME stage 3: In the last stage 1130 of processing in the motion estimation block, the predicted motion vectors are refined to determine to determine actual motion vectors between $200'_{t+k}$, $200'_t$ for (k=−3, −2, 2, 3), by searching around the corresponding predicted motion vectors. For example, to determine the motion vectors, a block-based motion estimation is performed with a search center at (x+C_MVx(t+k, t), y+C_MVy(t+k, t)) and a search areas (search_range_H2, search_range_V2) and (search_range_H3, search_range_V3), where the foregoing are programmable integers representing respectively the horizontal search range and vertical search range. The search range at this stage may be set to be smaller than that in the stage 1 of motion estimation to reduce the computational complexity of motion estimation.

Subsequent to motion estimation processing, the image $200_t'$ is subjected to processing for motion-compensated back projection (MCBP) in 115. The inputs to this block are the frames and motion estimation results from $200_{t+k}'$, (k=−3, −2, −1, 1, 2, 3), and frame $200_t'$. The output from the MCBP processing block is the updated high resolution frame, denoted as $200_t''$.

Figure 11:
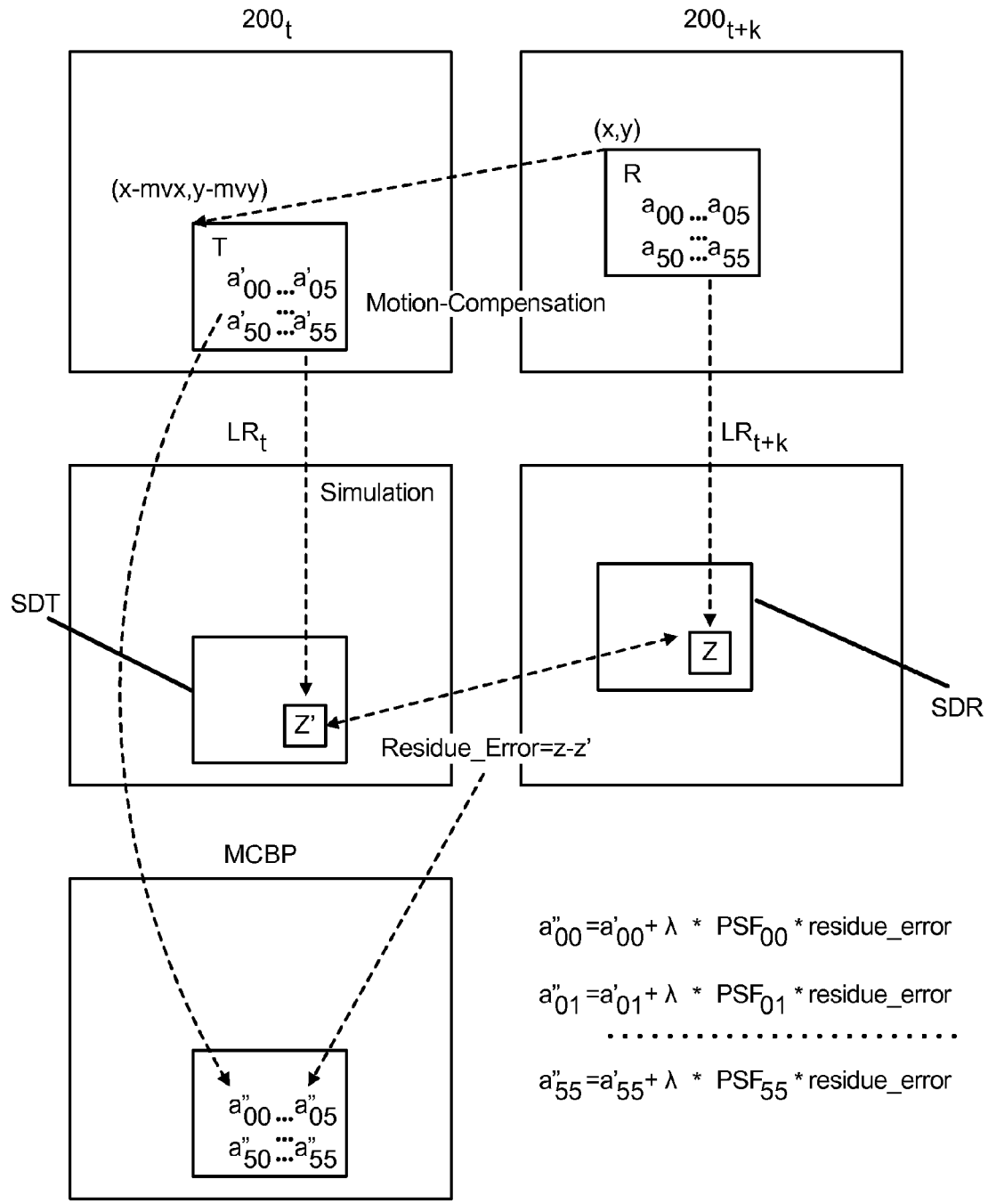
FIG. 11 is a block diagram describing motion compensated back projection in accordance with an embodiment of the present invention.

The motion-compensated back prediction of 1035 between two exemplary frames is described in FIG. 11. The frame ordering favors frames that are temporally close to $200_t'$ over frames further away. Temporally close frames are favored because motion estimation is generally more reliable for a pair of frames with a smaller temporal distance than that with a larger temporal distance.

For each block-grid-aligned block R in $200_{t+3}'$, the corresponding motion-compensated block T in $200_t$ is found using the motion estimation results. For example, if block R is at the position (x, y) in $200_{t+3}'$ and its motion vector is (mvx, mvy), the corresponding motion compensated block T is the block at the position (x-mvx, y-mvy) in $200_t'$.

For each pixel z in the lower resolution frame $200_{t+3}$ within the spatial location of block R, the corresponding pixels are identified in block R of $200_{t+3}$ based on a predetermined spatial window, for example, $a_{00} \ldots a_{55}$. Since the block T in $200_t'$ will not necessarily align with pixel boundaries in $200_t$, the corresponding pixels z' in block T have to be simulated by the pixels in block T, that correspond to $a_{00} \ldots a_{55}$, e.g., $a'_{00} \ldots a'_{55}$.

To simulate each pixel z', the point spread function (PSF) in the image acquisition process is used. Since PSF is generally not available to high-resolution processing and it often varies among video sources, an assumption may be made with regard to the PSF, considering both the required robustness and computational complexity.

For example, a poly-phase down-sampling filter may be used as PSF. The filter may consist, for example, of a 6-tap vertical poly-phase filter and a consequent 6-tap horizontal poly-phase filter. Pixel z' in SDT is in the vicinity of $a'_{00}$ $a'_{55}$. Pixel z' can be calculated as follows:

$$z' = \sum_{i=0}^{5} \sum_{j=0}^{5} PSF_{ij} * a'_{ij} \tag{7}$$

where $PSF_{ij}$ is the coefficient in the PSF corresponding to $a'_{ij}$. In another embodiment of this invention, a bi-cubic filter may be used as the PSF.

The residue error between the simulated pixel z' and the observed pixel z is computed, as residue_error=z−z'. The pixels in $200_t'$ can be updated for example, from pixels $a'_{00} \ldots a'_{55}$ in $200_t'$ to pixels $a''_{00} \ldots a''_{55}$, according to the calculated residue error and scaling factor as shown below.

$$a_{ij}''=a'_{ij}+\lambda*PSF_{ij}*\text{residue (for } i=0 \ldots 5, j=0 \ldots 5) \tag{3}$$

The residue error is scaled by $\lambda*PSF_{ij}$ and added back to the pixel $a'_{ij}$ in $200_t'$ to generate the pixel $a''_{ij}$. The purpose of $PSF_{ij}$ is to distribute the residue error to the pixels $a'_{ij}$ in $200_t'$ according to their respective contributions to the pixel z'. As proposed herein, a purpose of the scaling factor $\lambda$ is to increase the robustness of the algorithm to motion estimation inaccuracy and noise. $\lambda$ may be determined according to the reliability of the motion estimation results for the block R. The motion estimation results can include (mvx, mvy, sad, nact). Among the eight immediate neighboring blocks of R in $200_{t+3}'$, sp may be the number of blocks whose motion vectors are not different from (mvx, mvy) by 1 pixel (in terms of the high-resolution), both horizontally and vertically. In an embodiment of this invention, $\lambda$ may be determined below:

| | |
|---|---|
| if sp ≥ 1 && sad<nact*4/4 | $\lambda = 1$; |
| else if sp ≥ 2 && sad<nact*6/4 | $\lambda = 1/2$; |
| else if sp ≥ 3 && sad<nact*8/4 | $\lambda = 1/4$; |
| else if sp ≥ 4 && sad<nact*10/4 | $\lambda = 1/8$; |
| else if sp ≥ 5 && sad<nact*12/4 | $\lambda = 1/16$; |
| else | $\lambda = 0$; |

The contribution from the residue error to updating the pixels in $200_t'$ can be proportional to the reliability of the motion estimation results. This proportionality is measured in terms of motion field smoothness, represented by the variable sp in the neighborhood of R and how good the match is between R and T, for example, as represented by comparison of sad and nact.

In another embodiment of the invention, in calculating the scaling factor $\lambda$, the reliability of the motion estimation results may be measured using the pixels in $200_t'$ and $200_{t+3}'$ corresponding to the pixel z, i.e., $a_{00} \ldots a_{55}$ in $200_{t+3}'$ and $a'_{00} \ldots a'_{55}$ in $200_t'$. For example, sad and nact be computed from these pixels only instead from all the pixels in R and T.

For example, if the block size is 4×4 pixels, the sad between R and T may be defined as in Equation 8:

$$\text{sad} = \sum_{i=-1}^{4} \sum_{j=-1}^{4} |R_{i,j} - T_{i,j}| \tag{8}$$

and act of R may be defined as in Equation 9:

$$\text{act} = \sum_{i=-1}^{3} \sum_{j=-1}^{4} |R_{i,j} - R_{i+1,j}| + \sum_{i=-1}^{4} \sum_{j=-1}^{3} |R_{i,j} - R_{i,j+1}| \tag{9}$$

$R_{i,j}$ refers to the i,j pixel of R, and likewise $T_{i,j}$ refers to the i,j pixel of T. Block R is a rectangular area with a top-left pixel of $R_{0,0}$ and a bottom right pixel of $R_{3,3}$. Likewise block T is a rectangular area with a top-left pixel of $T_{0,0}$ and a bottom right pixel of $T_{3,3}$. Equations (88) and (9) are indicative of the fact that the pixels surrounding R and T may also be used in the computation of sad and act. The activity of a block may be used to evaluate the reliability of corresponding motion estimation results. To accurately reflect reliability, act may have to be normalized against the corresponding SAD in terms of the number of absolute pixel differences, as shown below in Equation 10:

$$nact = \frac{act * num\_pixels\_in\_sad}{num\_pixels\_in\_act} \tag{10}$$

where num_pixels_in_sad is the number of absolute pixel differences in the calculation of sad, and num_pixels_in_act is that of act, respectively. The term nact is the normalized activity of the block. Note that the surrounding pixels of R and T may be used in calculating sad and act as well.

The foregoing can be repeated for the frames for each time period in the following order, t+3, t−3, t+2, t−2, t+1, and t−1, resulting in a motion compensated back predicted higher resolution frame $200_t''$.

Motion Free Back Projection

Subsequent to motion compensated back projection, the image $200_t'$ is subjected to processing for motion-free back projection (MCBP) at 1135. The inputs to this block are the frame $200_t'$, and motion compensated back predicted higher resolution frame $200_t''$. The output from the MCBP processing block is the high resolution frame.

Motion-free back projection between frame $200_t'$ and frame $200_t''$ are performed similar to motion-compensated back projection, except that all motion vectors are set to zero and the weighting factor $\lambda$ is a constant.

Figure 12:
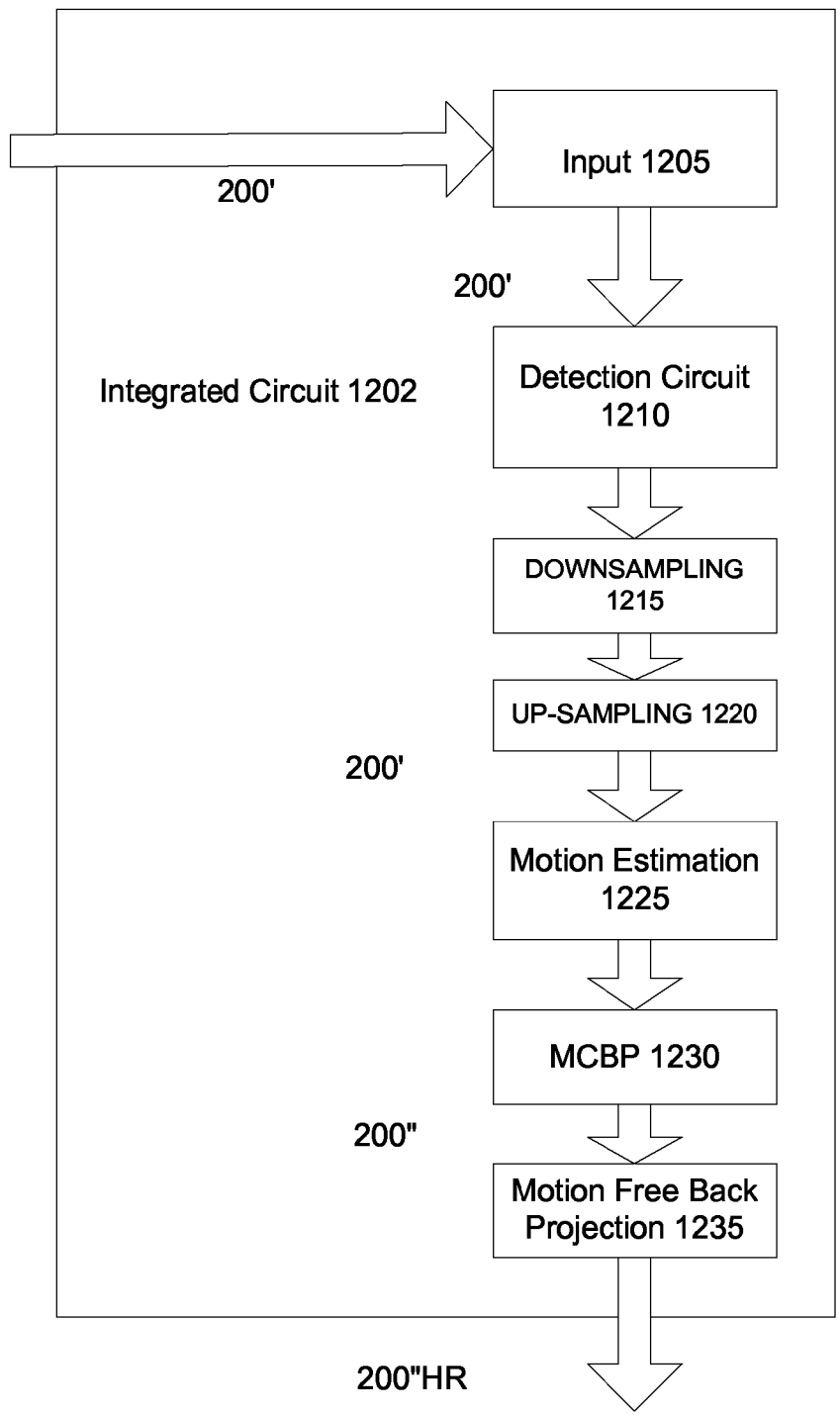
FIG. 12 is block diagram of an exemplary integrated circuit for providing high resolution frames in accordance with another embodiment of the present invention.

Referring now to FIG. 12, there is illustrated a block diagram describing a system for generating high-resolution frames. The system comprises an integrated circuit 1202. The integrated circuit 1202 comprises an input 1205, a detection circuit 1210, a down-sampling circuit 1215, an up-sampling circuit 1215, a motion estimator 1225, a motion compensation back projection circuit 1230, and a motion free back projection circuit 1235.

The integrated circuit 1202 comprises an input 1155 that receives arbitrary resolution frames at 1005. The integrated circuit 1202 comprises a detection circuit 1210 that detects the scaling ratios and scaling offsets between original lower resolution pixels as well as the kernel (size and coefficients) used in the spatial interpolation at 1015.

The down-sampling circuit 1215 down-samples the arbitrary resolution frames to frames 200 having a predetermined lower resolution during 1015. The up-sampling circuit 1215 up-samples the frames during 1025 to frames 200' having the predetermined higher resolution. The motion estimator 1225 performs the motion estimation during 1030. The motion compensation back projection circuit 1230 performs motion compensation back projection during 1035, resulting in the updated higher resolution frames 200". The motion free back projection circuit 1235 performs motion free back projection, resulting in the predetermined higher resolution frames 200″HR.

It is noted that the motion estimator 1225 can be appropriately equipped with buffers to permit pipelining and recursion. For example, where three earlier frames and three later frames are used for a frame, the motion estimation results of the two earlier frames and all three later frames are also used for the next frame. Accordingly, the motion estimator 1225 buffers the results of the motion estimation results of the two earlier frame and all three later frames. Additionally, motion estimator 1225, motion compensator 1230, and motion-free back projection circuit 1235 can operate on three consecutive frames simultaneously.

Figure 13:
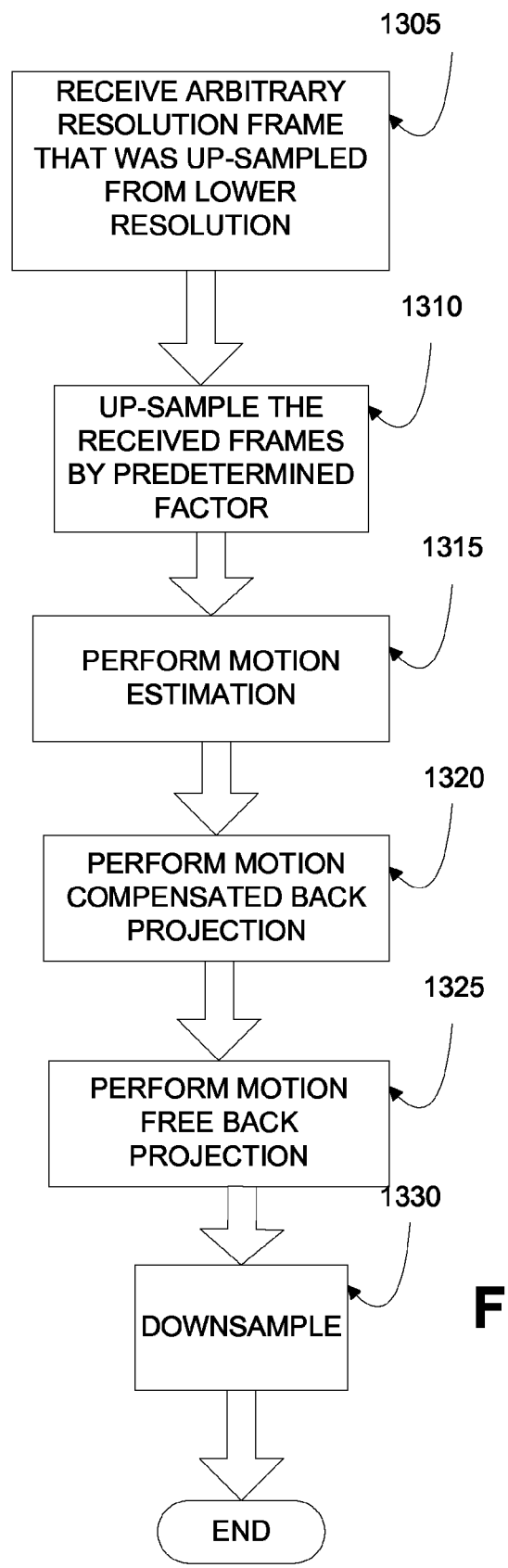
FIG. 13 is a flow diagram for providing higher resolution frames in accordance with another embodiment of the present invention.

Referring now to FIG. 13 there is illustrated a flow diagram for generating higher resolution frames with a predetermined resolution. At 1305, an arbitrary resolution frame is received that was up-sampled from a lower resolution. At 1310, the arbitrarily up-scaled frames are up-scaled by a predetermined integer factor. At 1315, motion estimation is performed on the frames resulting from 1310. At 1315 motion compensated back projection is performed with the frames resulting from 1310, resulting in updated frames. At 1325, motion free back projection is performed. At 1330, the frames resulting from 1325 are downsampled to the predetermined higher resolution frame.

Figure 14:
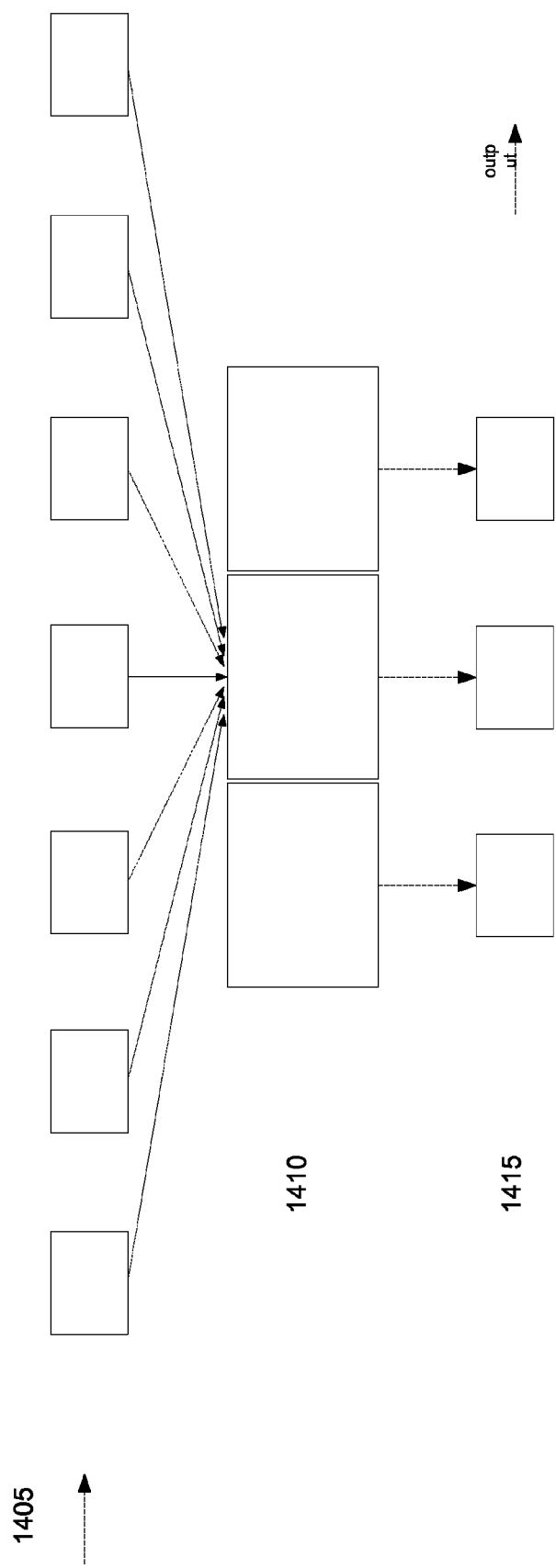
FIG. 14 is a block diagram describing up-sampling and down-sampling in accordance with an embodiment of the present invention.

Referring to FIG. 14, frames 1405 are arbitrary resolution frames received during 1305. Frames 1410 are the result of up-scaling frames 1405, motion estimation 1315, motion compensated back projection 1315, and motion free back projection 1325. Frames 1415 are the result of downscaling the frames 1415 to a predetermined higher resolution.

Figure 15:
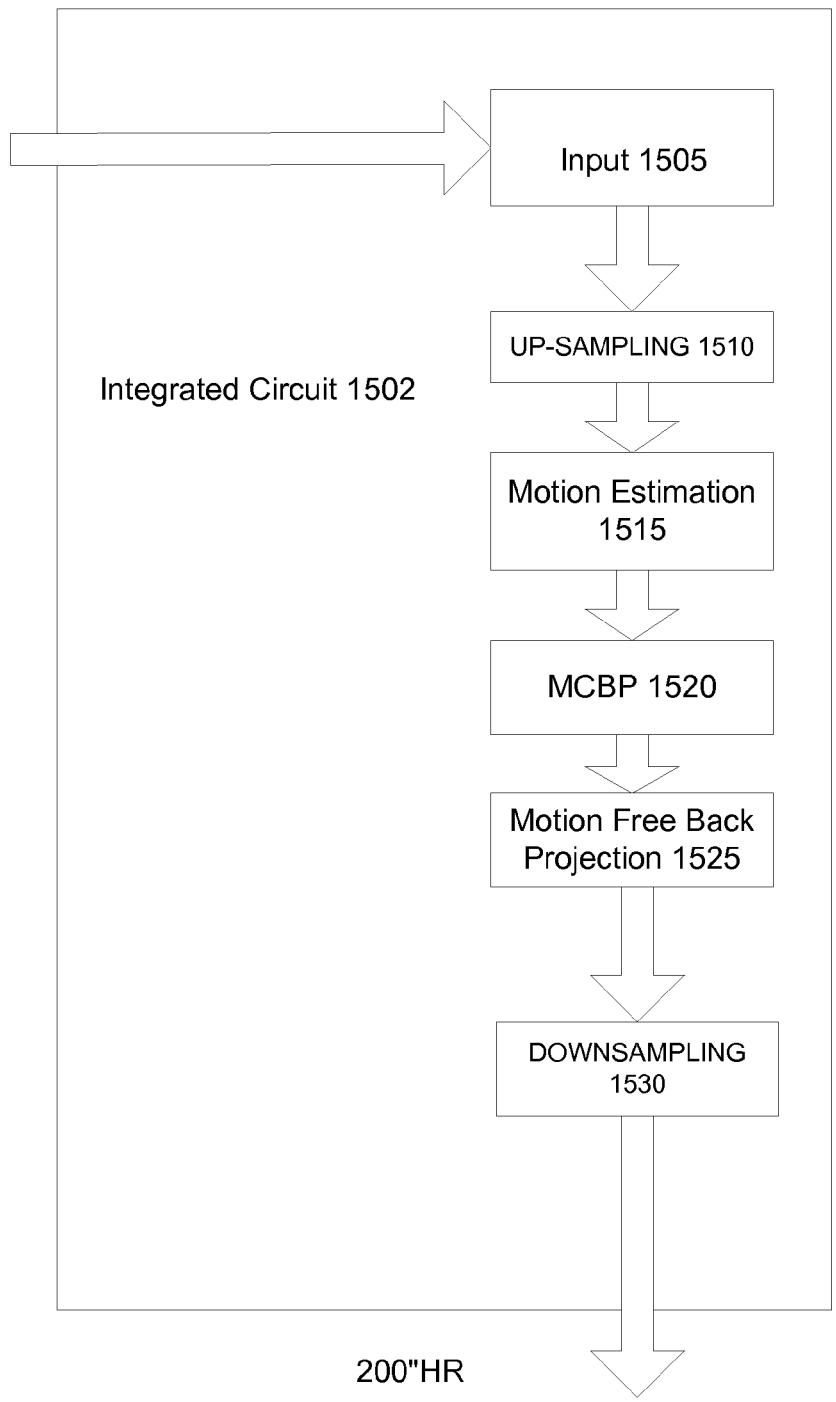
FIG. 15 is a block diagram of an exemplary integrated circuit for providing high resolution frames in accordance with another embodiment of the present invention.

Referring now to FIG. 15, there is illustrated a block diagram describing an exemplary system for generating higher resolution frames with a predetermined resolution. The system comprises an integrated circuit 1500 comprising an input 1505, an up-sampler 1510, a motion estimator 1515, a motion compensation back projection circuit 1515, a motion free back projection circuit 1525, and a down-sampler 1530.

An arbitrary resolution frame 1405 is received that was up-sampled from a lower resolution by the input 1505 as in 1305. The arbitrarily up-scaled frames are up-scaled by a predetermined integer factor by the up-sampler 1510 as in 1310. The motion estimator 1515 performs motion estimation on the frames 1410 resulting from 1310. The motion compensated back projection circuit 1515 performs motion compensated back projection with the frames 1410, as in 1315, and the motion free back projection circuit 1525 performs motion free back projection as in 1325. The down-sampler 1530 down-samples the frames from 1525 to the predetermined higher resolution frame, as in 1330.

The embodiments described herein may be implemented as a board level product, as a single chip, application specific integrated circuit (ASIC), or with varying levels of the system integrated with other portions of the system as separate components. Alternatively, certain aspects of the present invention are implemented as firmware. The degree of integration may primarily be determined by the speed and cost considerations.

While the present invention has been described with reference to certain embodiments, it will be understood by those skilled in the art that various changes may be made and equivalents may be substituted without departing from the scope of the present invention. Therefore, it is intended that the present invention not be limited to the particular embodiment disclosed, but that the present invention will include all embodiments falling within the scope of the appended claims and equivalents thereof.

Therefore, at least the following is claimed:

1. A method, comprising:
   receiving frames;
   determining whether the frames correspond to upscaled frames; and
   in response to determining that the frames correspond to upscaled frames:
      motion estimating the upscaled frames; and
      motion compensating the upscaled frames,
   wherein motion estimating the upscaled frames comprises:
      generating first motion vectors by motion estimating between an upscaled frame and a first frame that is adjacent in time to the upscaled frame;
      generating second motion vectors by motion estimating between the first frame and a second frame that is adjacent in time to the first frame; and
      estimating motion on the upscaled frame and the first frame by combining at least one of the first motion vectors with another motion vector that is based at least in part on at least one of the second motion vectors.

2. The method of claim 1, wherein determining whether the frames correspond to the upscaled frames further comprises estimating a kernel used in a spatial interpolation to upscale the frames.

3. The method of claim 1, wherein determining whether the frames correspond to the upscaled frames further comprises estimating at least one of: a scaling ratio or a scaling offset used in a spatial interpolation to upscale the frames.

4. The method of claim 1, wherein motion compensating the upscaled frames further comprises at least one of: performing motion-compensated back projection or performing motion-free back projection.

5. The method of claim 1, further comprising downscaling the upscaled frames to an original resolution, wherein the motion estimating and the motion compensating are performed on the upscaled frames that have been downscaled to the original resolution.

6. The method of claim 1, wherein motion compensating the upscaled frames comprises:
   generating an updated frame by motion compensating one of the upscaled frames with frames that are proximate to the one of the upscaled frames; and
   changing pixels in the updated frame based at least in part on the one of the upscaled frames.

7. The method of claim 6, wherein motion compensating the one of the upscaled frames with the frames that are proximate to the one of the upscaled frames further comprises simulating lower resolution pixels for the one of the upscaled frames and lower resolution pixels for the frames that are proximate to the one of the upscaled frames.

8. The method of claim 7, wherein simulating lower resolution pixels further comprises applying a point spread function.

9. A system including circuitry, the circuitry comprising:
   an input configured to receive upscaled frames;
   a downsampler configured to downsample the upscaled frames to a predetermined lower resolution;
   an upsampler configured to upsample the downsampled frames to a predetermined higher resolution;
   a motion estimator configured to motion estimate the upsampled frames produced by the upsampler; and
   a motion compensator configured to motion compensate the upsampled frames produced by the upsampler, wherein motion estimating the upsampled frames comprises:
  generating first motion vectors by motion estimating between an upsampled frame and a first frame that is adjacent in time to the upsampled frame;
  generating second motion vectors by motion estimating between the first frame and a second frame that is adjacent in time to the first frame; and
  estimating motion on the upsampled frame and the first frame by combining at least one of the first motion vectors with another motion vector that is based at least in part on at least one of the second motion vectors.

10. The system of claim 9, wherein the predetermined resolution corresponds to the resolution of the frames received by the input.

11. The system of claim 9, wherein the motion compensator is configured to perform at least one of: motion-compensated back projection or motion-free back projection.

12. The system of claim 9, wherein the circuitry further comprises a kernel estimator for estimating a kernel used in a spatial interpolation to upscale the upscaled frames.

13. The system of claim 9, wherein motion compensating the upsampled frames at the predetermined high resolution comprises:
  generating an updated frame by motion compensating an upsampled frame at the predetermined high resolution with frames that are proximate to the upsampled frame; and
  changing pixels in the updated frame based at least in part on the upsampled frame at the predetermined higher resolution.

14. A system, comprising:
circuitry capable of:
  receiving frames;
  generating upsampled frames by upsampling the frames to a higher resolution, wherein
the higher resolution is an integer factor higher than a resolution of the frames;
  motion estimating the upsampled frames;
  motion compensating the upsampled frames; and
downsampling the motion compensated upsampled frames to a predetermined resolution,
wherein motion estimating the upsampled frames comprises:
  generating first motion vectors by motion estimating between an upsampled frame and a first frame that is adjacent in time to the upsampled frame;
  generating second motion vectors by motion estimating between the first frame and a second frame that is adjacent in time to the first frame; and
  estimating motion on the upsampled frame and the first frame by combining at least one of the first motion vectors with another motion vector that is based at least in part on at least one of the second motion vectors.

15. The system of claim 14, wherein the circuitry is capable of performing motion-compensated back projection.

16. The system of claim 14, wherein the circuitry is capable of performing motion-free back projection.

* * * * *

UNITED STATES PATENT AND TRADEMARK OFFICE
CERTIFICATE OF CORRECTION

Page 1 of 1

PATENT NO. : 8,830,394 B2
APPLICATION NO. : 14/053064
DATED : September 9, 2014
INVENTOR(S) : Yunwei Jia et al.

It is certified that error appears in the above-identified patent and that said Letters Patent is hereby corrected as shown below:

In the Claims

Please replace column 14, line 16 with the following corrected version:

-- adjacent in time to the upscaled frame; --

Please replace column 14, line 19 with the following corrected version:

-- adjacent in time to the first frame; and --

Please replace column 15, line 5 with the following corrected version:

-- adjacent in time to the upsampled frame; --

Please replace column 15, line 8 with the following corrected version:

-- adjacent in time to the first frame; and --

Please replace column 16, line 17 with the following corrected version:

-- adjacent in time to the upsampled frame; --

Please replace column 16, line 20 with the following corrected version:

-- adjacent in time to the first frame; and --

Signed and Sealed this
Third Day of February, 2015

Michelle K. Lee
*Deputy Director of the United States Patent and Trademark Office*